United States Patent [19]

Motte et al.

[11] Patent Number: 4,587,660
[45] Date of Patent: May 6, 1986

[54] DIRECT-CURRENT METALLURGICAL ARC FURNACE AND METHOD OF MELTING WITH SAME

[75] Inventors: Jean-Pierre Motte; Ghislain Maurer, both of Metz, France

[73] Assignees: Institut de Recherches de la Siderurgie Francaise, Maizieres-les-Metz; Clecim SA, Courbevoie, both of France

[21] Appl. No.: 608,024

[22] Filed: May 3, 1984

[30] Foreign Application Priority Data

May 3, 1983 [FR] France ............................... 83 07317

[51] Int. Cl.[4] .............................................. H05B 7/20
[52] U.S. Cl. ...................................... 373/108; 373/102
[58] Field of Search ........................... 373/102–106, 373/108

[56] References Cited

U.S. PATENT DOCUMENTS

| 1,564,139 | 12/1925 | Saklatwalla | 373/102 |
| 3,999,000 | 12/1976 | Stenkvist | 373/108 |
| 4,254,298 | 3/1981 | Svedsen | 373/102 |

FOREIGN PATENT DOCUMENTS 0381862 1/1908 France ............................... 373/108

Primary Examiner—A. D. Pellinen
Assistant Examiner—Greg Thompson
Attorney, Agent, or Firm—Michael J. Striker

[57] ABSTRACT

A direct-current arc furnace has a vessel with a floor and a cover, at least two vault electrodes projecting down into the vessel through the cover, and a hearth electrode exposed in the vessel generally in the floor below the vault electrodes. A scrap-metal charge is melted in this furnace by first energizing the vault electrodes with direct-current voltage of opposite polarity while displacing them downward through the charge from an upper position spaced relatively far from the hearth electrode to a lower position spaced relatively close to the hearth electrode and thereby passing an electric current through the charge to melt the charge and form a puddle of molten metal on the floor of the vessel at the hearth electrode. Then the hearth electrode is energized with direct-current voltage of a polarity opposite that of one of the vault electrodes and an electric current is passed through the charge between the one vault electrode and the hearth electrode to melt the charge and form a puddle at the hearth electrode at the floor of the vessel. Thereafter the vault electrodes are raised while continuing to pass an electric current partly formed as an arc between at least the one vault electrode and the hearth electrode until the entire charge is melted.

9 Claims, 1 Drawing Figure

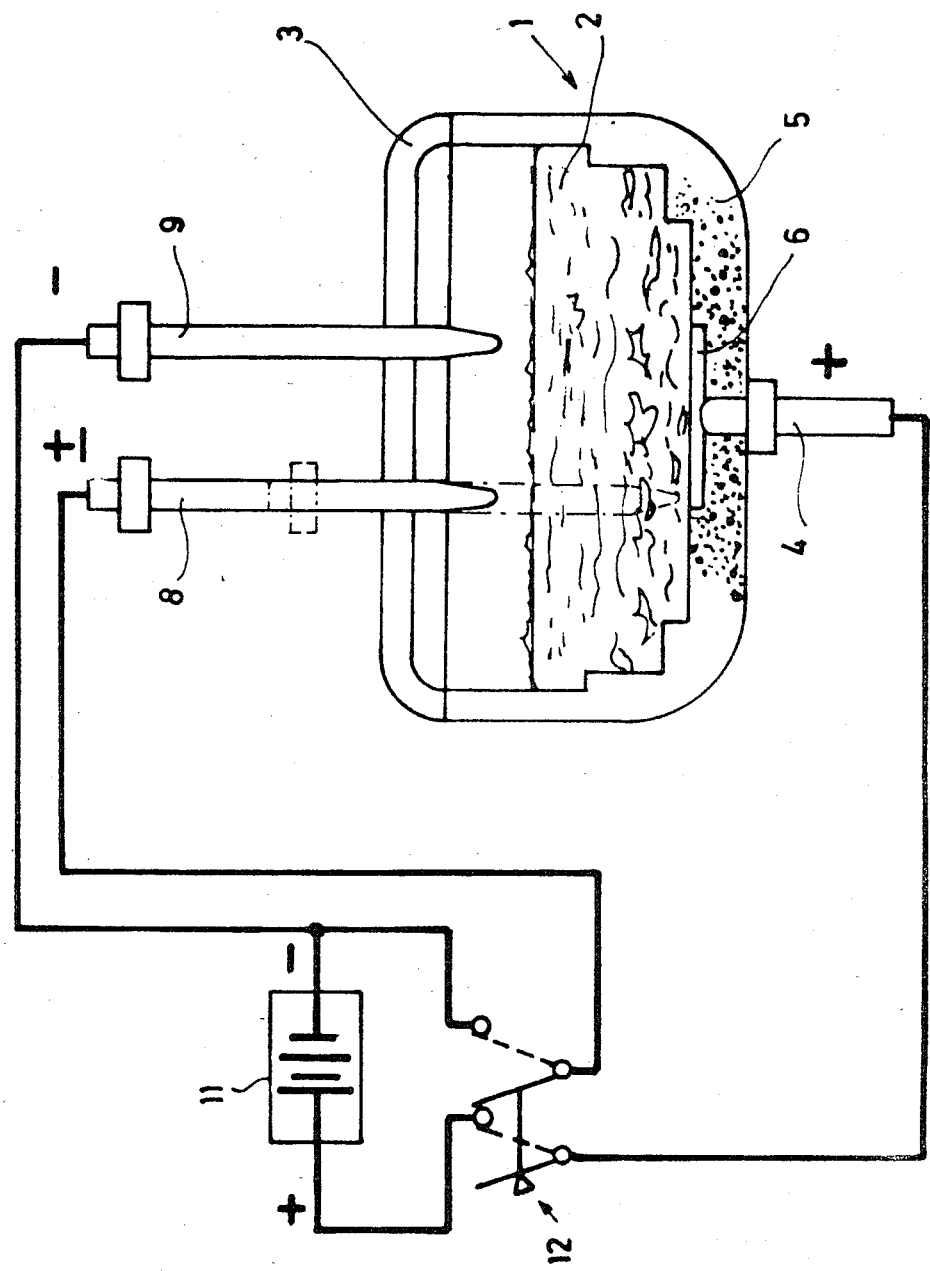

DIRECT-CURRENT METALLURGICAL ARC FURNACE AND METHOD OF MELTING WITH SAME

BACKGROUND OF THE INVENTION

The present invention relates to a metallurgical melting process and a direct current arc furnace for its application. More particularly, it relates to a metallurgical melting process and a direct current arc furnace for its application in which passage of the current takes place across the metal mass to be melted, between a moving vault electrode placed above the metal mass and maintaining an electric arc with the latter and a hearth electrode implanted in the wall (generally at the bottom of the furnace) and in permanent contact with the mass to be melted in order to assure the return of the current.

Metallurgical melting processes and direct current arc furnaces for its application of the above mentioned general type are known in the art.

The use of arc furnaces operating on direct current has, among other things, the advantage of making possible high capacities, adapted to the treatment of sizable metal masses in large-sized furnaces.

However, difficulties can occur in the starting phase of melting on a divided solid charge (scrap metal). To understand them well, it is necessary to recall briefly the operation of an electric arc furnace.

The method of operation, perfectly standardized and common to all furnaces of that type, regardless of the nature of the current which feeds them (alternating or direct current) is as follows:

After having put the charge to be melted in the furnace, the value electrodes are slowly dropped into the charge to nearly the bottom. The electrodes thus dig a hole by locally melting the solid material coming in contact with them during their descent. The molten metal percolates between the still solid fragments and forms on the bottom a puddle of molten metal "hot heel". Once the electrodes are completely descended, the starting phase is over and they are slowly brought up again, while maintaining an electric arc between the tips of the electrodes and the puddle of molten metal which grows as melting progresses. The latter is completed when the electrodes reach their stable top position.

On alternating current applications, several vault electrodes with opposite polarities are used. They are mounted relatively close to each other at a constant distance. Under these conditions, melting is started off easily, since the electric current is looped on two electrodes across the solid metal material lying between them.

On the other hand, on direct current applications, the vault electrode is too far from the hearth electrode in the starting phase to allow the furnace to operate at full capacity, as would be desirable in the melting period for maximum efficiency of the equipment.

SUMMARY OF THE INVENTION

Accordingly, it is an object of the present invention to provide a metallurgical melting process and direct current arc furnace for its application which avoids the disadvantages of the prior art.

More particularly, it is an object of the present invention to provide a metalurgical melting process and direct current arc furnace for its application which uses an additional electrode in the starting phase, when the electric current circulates through the charge between two relatively close vault electrodes, and after the starting phase, the hearth electrode can be set off, thus making it possible, without overly complicating the design of the furnace and the melting operations, to take full advantage of the features of the direct-current arc furnace.

In keeping with these objects, and with others which will become apparent hereinafter, one feature of the present invention resides, briefly stated in a process of metallurgical melting of a divided solid metal charge in a direct-current electric arc furnace equipped with a hearth electrode and a first moving vault electrode, capable of being put on opposite polarities wherein a second electrode is used in the starting phase of melting, which is electrically coupled to the first in opposite polarities and both vault electrodes penetrate the charge gradually so as to melt the charge and produce an electric coupling as the local melting of the charge occurs to the bottom of the furnace between the hearth electrode and at least one of the value electrodes and continues until the complete melting of the charge is obtained.

When the process of metallurgical melting is designed in accordance with the present invention, an additional electrode is used in the starting phase and allows the electric current to circulate through the charge between the two relatively close vault electrodes, and after the starting phase, the hearth electrode can be started thus making it possible, without overly complicating the design of the furnace and the melting operations, to take full advantage of the features of the direct current arc furnace.

In accordance with another feature of the present invention, at least one of the vault electrodes used in the starting phase consists of the vault electrode which is then utilized coupled with the hearth electrode in normal operation.

Still another feature of the present invention is to provide a metallurgical melting furnace having a bottom and a direct-current arc, including a direct current electric power supply, a hearth electrode that is flush with the bottom of the furnace, at least one first and second vault electrode, means for connecting to the direct current electric power source the hearth electrode and the first vault electrode under opposite polarities, wherein the connecting means includes switching means for making it possible for the current to pass from the hearth electrode to the second vault electrode and vice versa.

A further feature of the present invention is that the furnace contains two vault electrodes, of which one constitutes the first vault electrode.

Another feature of the present invention is that the hearth electrode is placed in the axis of the furnace and the two vault electrodes are placed symmetrically in relation to the axis of the furnace.

Still another feature of the present invention is that the switching means makes it possible to connect one of the vault electrodes alternately to either of the poles of the electric power source while the other vault electrode and the hearth electrode respectively remain permanently connected to each of the poles.

Still another feature of the present invention is that the hearth electrode has an end and the furnace has a bottom in which is formed at least one hot heel receiving chamber at the end of the hearth electrode.

Finally still another feature of the present invention is that the vault electrodes have vertical projections and at least one puddle chamber extends all around the hearth electrode to a distance sufficient to embrace the vertical projections of all of the vault electrodes.

BRIEF DESCRIPTION OF THE DRAWING

A schematic view of the furnace according to the present invention shown partially in section along a vertical plane of symmetry.

DETAILED DESCRIPTION OF THE PREFERRED EMBODIMENTS

A metallurgical melting furnace is shown formed as a cylindrical vessel or tank 1 designed to contain a metallic mass 2 to be melted and closed by a cover 3. A hearth electrode 4 projects through a refractory bottom 5 of the tank 1 up to the level of the interior surface, and in the center of a hot heel chamber 6 created in the refractory lining. The construction of the hearth electrode 4 is by itself standard and well known in the art of designing arc furnaces operating on a direct-current electric power supply.

At the top of the furnace, two vault electrodes 8 and 9 are shown that project through the cover 3 of the furnace. The electrodes 8 and 9 are arranged vertically in symmetrical positions in relation to the axis of the furnace. They are relatively close to each other by comparison with the distance separating them from the end of the hearth electrode, when they are in the upper position illustrated in solid lines in the figure. Their vertical geometric projections are inside the chamber 6, whose diameter is made wide enough for that purpose.

The two vault electrodes 8 and 9 are each vertically movable along their axes so as to be able to penetrate the mass 2 at variable levels until their lower ends can be brought to the bottom of the furnace. The means making it possible to displace them have not been represented on the figure, for they are in themselves standard and well known in the art.

The three electrodes 4, 8 and 9 are connectable to a direct current source 11. A first of the vault electrodes 9 is permanently connected to the negative pole, while a switch 12 (two-way double switch) makes it possible, depending on its position, either to connect the second vault electrode 8 to the positive pole, by leaving off the hearth electrode 4 (solid-line position), or to connect the vault electrode 8 to the negative pole, in parallel with the first, and the hearth electrode 4 to the positive pole (broken-line position).

In the application of the furnace described and represented, the melting operation involves two phases. Initially, the switch 12 is in the position shown by the solid line, for the starting phase. The vault electrodes 8 and 9 are turned on to opposite polarities and brought to the free surface of the materials to be melted. At the moment of contact the electric current is established producing melting of the materials at the tip of each electrode. As the lcoal melting progresses the electrodes are lowered, creating holes. This continues until they reach the bottom of the furnace, in proximity to the chamber 6. At the end of that starting phase, the liquid fills the chamber 6, thus forming the hot heel.

One then proceeds to the normal operating phase by reversing the switch 12 the (position represented by the broken lines). The electrodes 8 and 9 then both operate in parallel and in opposite polarity to the hearth electrode 4. The electric discharge arcs appear without difficulty owing to the proximity of the tips of the electrodes and the existence of the hot heel previously formed. The vault electrodes are then slowly raised again until complete melting of the entire charge is obtained.

According to one embodiment, the switch 12 makes it possible to place the vault electrodes 8, 9 on the same polarity, when the hearth electrode 4 is connected to the electric power supply 11.

The furnace according to the present invention can be charged with relatively sizable masses 2 of materials to be melted, entailing at the outset a distance between the hearth electrode 4 and each vault electrode 8 and 9 that is relatively large and much greater than that separating the ends of the two vault electrodes 8, 9 over the surface of the metal mass 2 to be melted.

It is, of course, possible, within the scope of the present invention, to provide several hearth electrodes 4, working together with several vault electrodes 8, 9.

Usually, however, the furnace according to the present invention will contain only one hearth electrode 4, advantageously set up in the axis of the furnace. The usual layout of known furnaces can then be adopted, with the vault electrode 8 or 9 employed in the normal operating phase entering the furnace vertically along the axis of symmetry, above the single hearth electrode 4. The second vault electrode 9 or 8, necessary for the starting phase, is then arranged laterally in relation to the first in order to be usable in conjunction with it in the starting phase.

According to another embodiment of the present invention, it can also be arranged to maintain the usefulness of all the electrodes 4, 8, 9 during the normal operating phase, by feeding all the vault electrodes 8, 9 simultaneously under the same polarity, opposite that of the hearth electrode 4. In that case, it is generally preferable to place the two vault electrodes 8, 9 necessary for starting, symmetrically in relation to the axis of the furnace and to the hearth electrode 4.

The invention does not exclude the use of a larger number of electrodes, e.g., several pairs of vault electrodes, with opposite polarities on the two electrodes of each pair during the starting phase.

To facilitate passage from one transient state to the other on use of the furnace according to the present invention, it is advantageous to equip the latter with switching means 12 making it possible to connect one of the vault electrodes (one of each pair when several pairs are provided) alternately to either of the poles of the electric power source 11, while the other vault electrode (the first according to the above description) and the hearth electrode 4 respectively remain permanently connected to each of the two poles.

According to other characteristics of the invention, the bottom of the furnace advantageously forms at least one hot heel receiving chamber 6 at the end of the hearth electrode 4. Possibly, a single hot heel chamber 6 can extend all around the hearth electrode to a distance sufficient to include the vertical geometric projections of all the vault electrodes 8, 9 that is the vault electrodes 8 and 9 are both directly above the puddle-forming chamber or recess 6. That type of chamber combines, on the one hand, the first fraction of liquid metal at the beginning of melting and, on the other, the remainder of the molten metal between two successive charges in an intermittent operation.

It will be understood that each of the elements described above, or two or more together, may also find a useful application in other types of metallurgical melting processes and direct-current arc furnace for its application differing from the types described above.

While the invention has been illustrated and described as embodied in a metallurgical melting process and direct-current arc furnace for its application, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method of melting a divided solid metal charge in a direct-current arc furnace having a vessel with a floor and a cover, at least two vault electrodes projecting down into the vessel through the cover, and a hearth electrode exposed in the vessel floor below the vault electrodes, the method comprising the steps of sequentially:
    (a) energizing the vault electrodes with direct-current voltage of opposite polarity while displacing the vault electrodes downward through the charge from an upper position spaced relatively far from the hearth electrode to a lower position spaced relatively close to the hearth electrode and thereby passing an electric current through the charge to melt the charge and form a puddle of molten metal on the floor of the vessel at the hearth electrode;
    (b) energizing the hearth electrode which direct-current voltage of a polarity opposite that of one of the vault electrodes and passing an electric current through the charge between the one vault electrode and the hearth electrode to melt the charge and form a puddle at the hearth electrode at the floor of the vessel; and
    (c) thereafter raising the vault electrodes while continuing to pass an electric current partly formed as an arc between at least the one vault electrode and the hearth electrode until the entire charge is melted.

2. The melting method defined in claim 1 wherein there are only two such vault electrodes associated with the hearth electrode.

3. A direct-current electric arc furnace which melts a divided metal charge, the furnace comprising:
    a vessel having an upper cover and a lower floor;
    a hearth electrode exposed in the vessel generally at the floor thereof;
    at least two vault electrodes projecting down into the vessel and both displaceable between an upper position relatively far above the hearth electrode and a lower position relatively close thereto;
    a direct-current voltage source having a pair of opposite poles; and
    switch means connected between the source and the electrodes oppositely polarizing the vault electrodes as the vault electrodes move from the upper to the lower position and polarizing the hearth electrode oppositely to at least one of the vault electrodes as the vault electrodes move from the lower to the upper position, whereby as the vault electrodes move down they locally melt the charge between them and as they move up they melt the charge between at least the one vault electrode and the hearth electrode.

4. The arc furnace defined in claim 3 wherein there are only two such vault electrodes.

5. The arc furnace defined in claim 4 wherein the two vault electrodes are symmetrical with respect to the axis of the furnace and the hearth electrode.

6. The arc furnace defined in claim 3 wherein the one vault electrode is permanently connected to one of the poles of the source and the switch means connects the other vault electrode during downward movement of the vault electrodes to the opposite pole and during upward movement to the same pole.

7. The arc furnace defined in claim 3 wherein the floor of the furnace is formed with a puddle-holding recess at the hearth electrode.

8. The arc furnace defined in claim 7 wherein at least the one vault electrode is vertically directly above the recess.

9. The arc furnace defined in claim 4 wherein the vault electrodes are spaced apart by a predetermined distance and are spaced above the hearth electrode in the upper position by a substantially greater distance.

* * * * *